United States Patent
Chen et al.

(10) Patent No.: US 8,248,565 B2
(45) Date of Patent: Aug. 21, 2012

(54) ACTIVE DEVICE ARRAY SUBSTRATE

(75) Inventors: Ping-Lin Chen, Kaohsiung (TW);
Yi-Chang Chen, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 267 days.

(21) Appl. No.: 12/831,271

(22) Filed: Jul. 7, 2010

(65) Prior Publication Data

US 2011/0267572 A1 Nov. 3, 2011

(30) Foreign Application Priority Data

May 3, 2010 (TW) .............................. 99114079 A

(51) Int. Cl.
*G02F 1/1343* (2006.01)

(52) U.S. Cl. ...................................... 349/143

(58) Field of Classification Search .................. 349/143
See application file for complete search history.

(56) References Cited

U.S. PATENT DOCUMENTS

| 7,403,254 | B2 * | 7/2008 | Lee et al. ...................... 349/141 |
| 2007/0165171 | A1 * | 7/2007 | Lee ............................... 349/139 |
| 2011/0051027 | A1 * | 3/2011 | Shin et al. ...................... 349/42 |
| 2011/0234935 | A1 * | 9/2011 | Konno et al. ................... 349/43 |

* cited by examiner

*Primary Examiner* — Sung Pak
(74) *Attorney, Agent, or Firm* — Jianq Chyun IP Office

(57) ABSTRACT

An active device array substrate includes a substrate, first scan lines, second scan lines, data lines, display units and a meshed common line. The first and second scan lines are alternately arranged on the substrate. Each of the display units is respectively located between two adjacent data lines and respectively includes a first pixel and a second pixel, wherein the first pixel is electrically connected to one of the first scan lines, the second pixel is electrically connected to one of the second scan lines, and the first and second pixels are respectively electrically connected to a different data line. In addition, the meshed common line includes ring-shaped patterns, wherein each ring-shaped pattern includes two semi-ring-shaped patterns connected to each other and respectively located at both sides of a single data line, and the two semi-ring-shaped patterns of a same ring-shaped pattern are respectively located under different display units.

8 Claims, 3 Drawing Sheets

ACTIVE DEVICE ARRAY SUBSTRATE

CROSS-REFERENCE TO RELATED APPLICATION

This application claims the priority benefit of Taiwan application serial no. 99114079, filed on May 3, 2010. The entirety of the above-mentioned patent application is hereby incorporated by reference herein and made a part of this specification.

BACKGROUND OF THE INVENTION

1. Field of the Invention

The present invention generally relates to a liquid crystal display panel (LCD panel), and more particularly, to an active device array substrate of an LCD panel.

2. Description of Related Art

The rapid development in the multimedia society is largely attributed to the fast progress in semiconductor devices or human-machine display apparatuses. In terms of a display, a cathode ray tube (CRT) has been substituted by a TFT-LCD panel. Therefore, a flat display, due to advantages of high display quality, high space utilization, low power consumption and no radiation, such as a TFT-LCD panel or an organic electroluminescent display (OELD) panel has played a major role in the mainstream display market.

A flat display is usually composed of a display panel and a plurality of driver ICs, wherein the display panel has a pixel array, and each pixel of the pixel array is driven by a corresponding scan line and a corresponding data line. In order to make the flat display application more popular, the related manufacturers in great passion put efforts to try reducing the cost of a flat display. In recent years, a so-called half source driver architecture design (HSD architecture design) has been launched, which is mainly based on the idea that by a layout design of the pixel array to reduce the number of the employed data driver ICs. In more details, in a pixel array with an HSD architecture, every two adjacent sub-pixel columns share a same data line so that the total number of the data lines are reduced into a half while the total number of the scan lines are increased for double. The HSD architecture design thereby enables the total number of the employed data lines and accordingly the total number of the required source drivers is reduced into a half, while the total number of the required gate drivers are increased for double. However, it should be noted that the cost of a gate driver is lower than the cost of a source driver so that the production cost of a flat display can be effectively reduced.

Taking a TFT-LCD panel as an example, the panel is mainly composed of a TFT array substrate, a color filter substrate and a liquid crystal layer, wherein a common line on the TFT array substrate corresponding to each sub-pixel is laid out in an H-shaped design. Since the capacitance coupling effect between a conventional H-shaped common line and the data lines is quite significant, so that the common voltage thereof would be drifted due to the coupling effect of the data lines, which leads the TFT-LCD panel having bright-dark lines problem during displaying and poor display quality.

SUMMARY OF THE INVENTION

Accordingly, the present invention is directed to an active device array substrate capable of reducing the coupling effect between the common line and the data lines thereof.

The present invention provides an active device array substrate, which includes a substrate, a plurality of first scan lines, a plurality of second scan lines, a plurality of data lines, a plurality of display units and a meshed common line. The first scan lines and the second scan lines are alternately arranged on the substrate. The data lines are disposed on the substrate and intersected with the first scan lines and the second scan lines. The display units are disposed on the substrate, wherein each display unit is respectively located between two adjacent data lines and includes a first pixel and a second pixel, wherein the first pixel is electrically connected to one of the first scan lines, the second pixel is electrically connected to one of the second scan lines, and the first pixel and the second pixel are respectively electrically connected to a different data line. In addition, the meshed common line is disposed on the substrate and located under the display units and includes a plurality of ring-shaped patterns electrically connected to each other, wherein each ring-shaped pattern includes two semi-ring-shaped patterns connected to each other and respectively located at both sides of a single data line, and the two semi-ring-shaped patterns of a same ring-shaped pattern are respectively located under different display units.

In an embodiment of the present invention, each first pixel includes a first active device and a first pixel electrode electrically connected to the first active device, and each second pixel includes a second active device and a second pixel electrode electrically connected to the second active device. For example, in a same display unit, a semi-ring-shaped pattern extends along the edge of the first pixel electrode and another semi-ring-shaped pattern extends along the edge of the second pixel electrode. In addition, in a same display unit, the connection place between the two semi-ring-shaped patterns is corresponding to a region between the first pixel electrode and second pixel electrode.

In an embodiment of the present invention, the above-mentioned meshed common line further includes a plurality of connection patterns, wherein the connection patterns are intersected with the first scan lines and the second scan lines, and the connection patterns are connected between the ring-shaped patterns. For example, the material of the above-mentioned connection pattern is substantially the same as the materials of the first pixel electrode and the second pixel electrode.

In an embodiment of the present invention, the materials of the above-mentioned first scan line and second scan line and the ring-shaped pattern are substantially the same.

In an embodiment of the present invention, the above-mentioned meshed common line does not have a pattern parallel to the data lines at the location under the data lines.

Based on the depiction above, since the overlaying area of the meshed common line of the present invention of the data lines is small, so that on the active device array substrate of the present invention the parasitic capacitance between the data lines and the meshed common line can be effectively reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
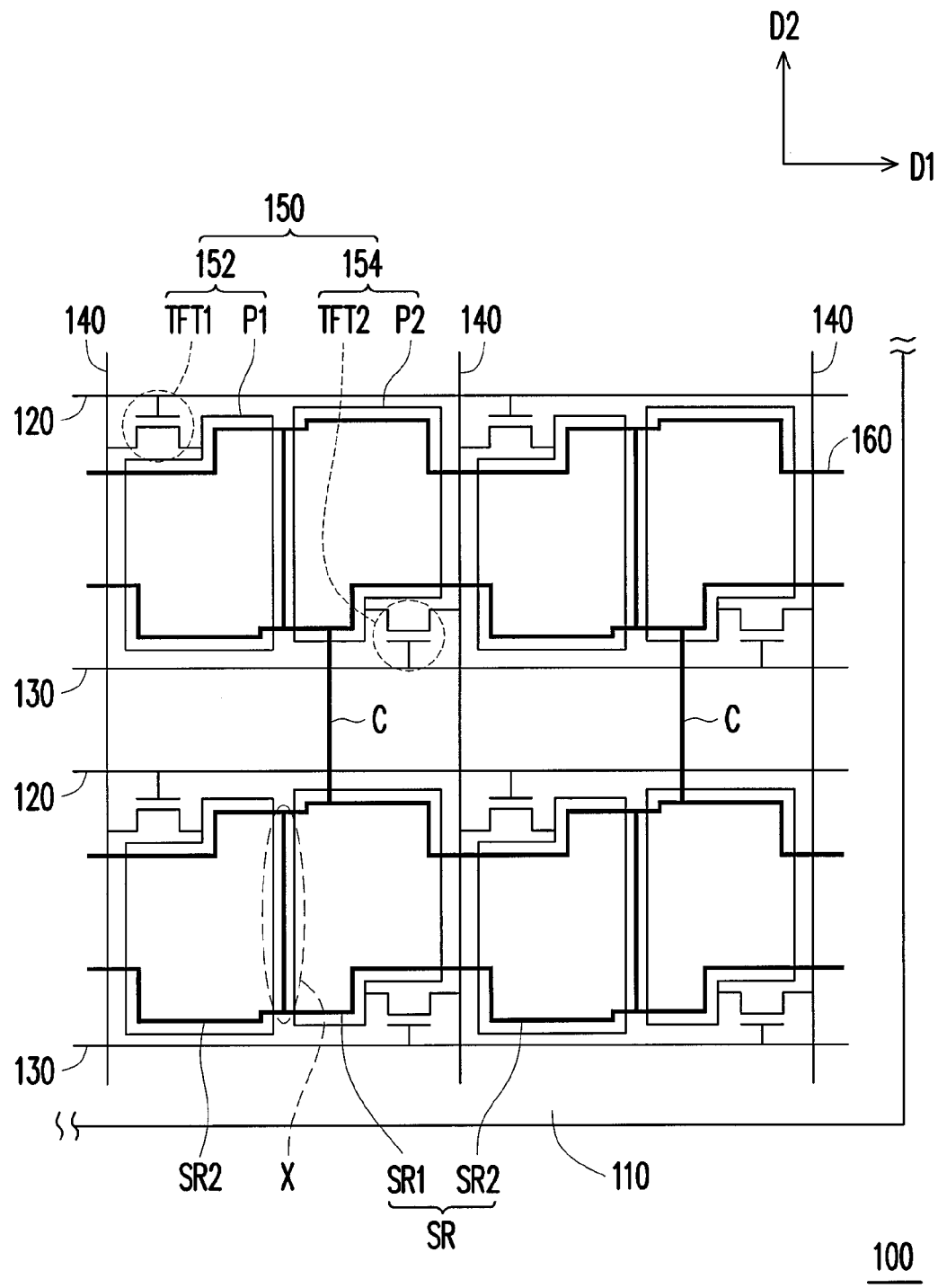
FIG. 1 is a diagram of an active device array substrate according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
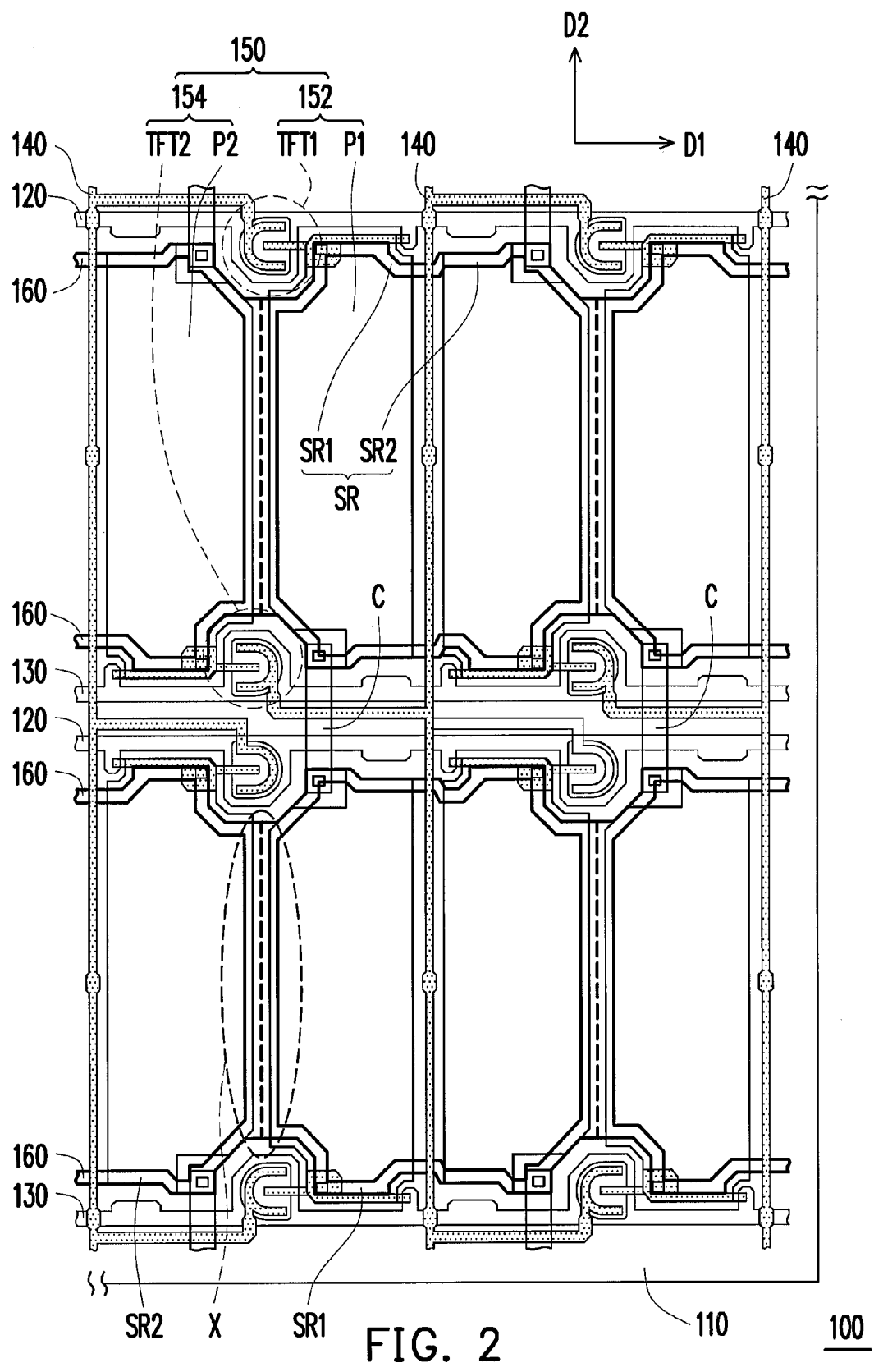
FIG. 2 is a layout diagram of an active device array substrate according to an embodiment of the present invention.

FIG. 1 is a diagram of an active device array substrate according to an embodiment of the present invention and FIG. 2 is a layout diagram of an active device array substrate according to an embodiment of the present invention. Referring to FIGS. 1 and 2, an active device array substrate 100 of the embodiment includes a substrate 110, a plurality of first scan lines 120, a plurality of second scan lines 130, a plurality of data lines 140, a plurality of display units 150 and a meshed common line 160. The first scan lines 120 and the second scan lines 130 are alternately arranged on the substrate 110. The data lines 140 are disposed on the substrate 110 and intersected with the first scan lines 120 and the second scan lines 130. The display units 150 are disposed on the substrate 110, and each of the display units 150 is respectively located between two adjacent data lines 140. Each display unit 150 includes a first pixel 152 and a second pixel 154, wherein the first pixel 152 is electrically connected to one of the first scan lines 120, the second pixel 154 is electrically connected to one of the second scan lines 130, and the first pixel 152 and the second pixel 154 are respectively electrically connected to a different data line 140.

Figure 3:
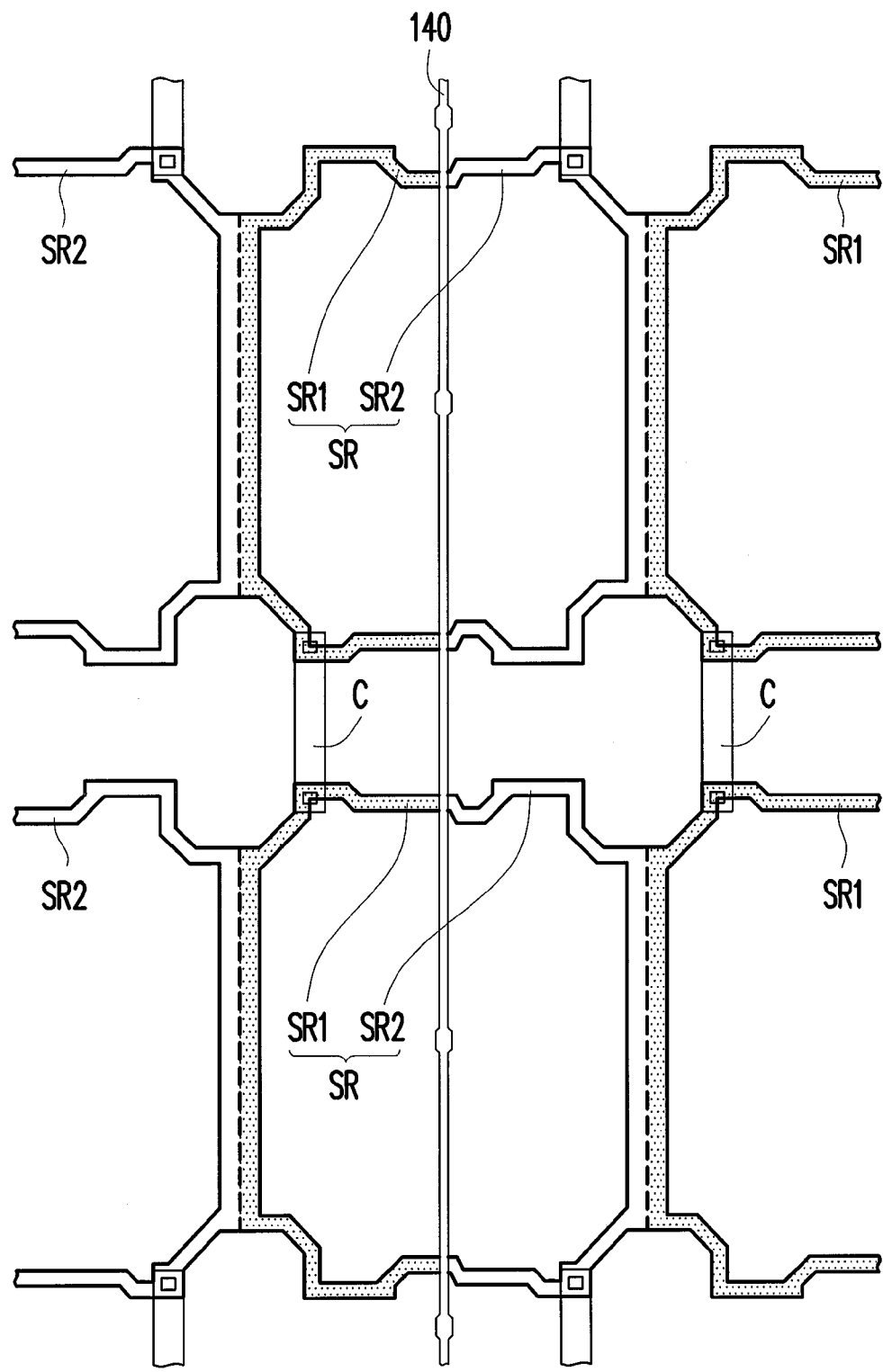
FIG. 3 is a diagram of a meshed common line according to an embodiment of the present invention.

FIG. 3 is a diagram of a meshed common line according to an embodiment of the present invention. Referring FIGS. 1-3, the meshed common line 160 is disposed on the substrate 110 and is located under the display units 150. The meshed common line 160 includes a plurality of ring-shaped patterns SR electrically connected to each other, each of the ring-shaped patterns SR includes two semi-ring-shaped patterns SRI and SR2 connected to each other and respectively located at both sides of a single data line 140, and the two semi-ring-shaped patterns SR1 and SR2 in a same ring-shaped pattern SR are respectively located in different display units 150.

In the embodiment, the substrate 110 can adopt a flexible substrate or a rigid substrate. For example, the substrate 110 can be glass substrate, plastic substrate or substrate made of other appropriate materials, which the present invention is not limited to.

The first scan lines 120, the second scan lines 130 and the ring-shaped patterns SR can be fabricated with a same photolithography and etch process (PEP). In other words, the first scan lines 120, the second scan lines 130 and the ring-shaped patterns SR belong to a same patterned film layer and have substantially the same material. In addition, the first scan lines 120 and the second scan lines 130 extend, for example, along the row direction D1, and the first scan lines 120 and the second scan lines 130 are alternately arranged on the substrate 110 along the column direction D2. The first scan lines 120, the second scan lines 130 and the ring-shaped patterns SR are electrically insulated from each other.

As shown by FIGS. 1-3, the data lines 140 extend along the column direction D2, and the data lines 140 are fabricated with another PEP. It should be noted that prior to fabricating the data lines 140, usually a gate insulator (not shown) is formed at first to overlay the above-mentioned first scan lines 120, second scan lines 130 and ring-shaped patterns SR to ensure the data lines 140 do not get short circuit on the first scan lines 120, the second scan lines 130 and the ring-shaped patterns SR at the intersected places of them.

In the embodiment, each first pixel 152 includes a first active device TFT1 and a first pixel electrode P1 electrically connected to the first active device TFT1, and each second pixel 154 includes a second active device TFT2 and a second pixel electrode P2 electrically connected to the second active device TFT2. As shown by FIGS. 1-3, the first active device TFT1 and the second active device TFT2 are, for example, TFTs, and the gates, the sources and the drains of the TFTs can be fabricated together with the above-mentioned data lines 140, first scan lines 120, second scan lines 130 and ring-shaped patterns SR. For example, the gates of the TFTs can be fabricated together with the first scan lines 120, the second scan lines 130 and the ring-shaped patterns SR, while the sources and the drains of the TFTs can be fabricated together with the data lines 140.

For example, in a same display unit 150, a semi-ring-shaped pattern (i.e., the semi-ring-shaped pattern SR1) extends along the edge of the first pixel electrode P1 and another semi-ring-shaped pattern (i.e., the semi-ring-shaped pattern SR2) extends along the edge of the second pixel electrode P2. In more details, the notch of the semi-ring-shaped pattern SRI is, for example, towards the left side, while the notch of the semi-ring-shaped pattern SR2 is, for example, towards the right side. It is clear from FIGS. 1-3 that among two adjacent display units 150 arranged at a same row, the two adjacent ring-shaped patterns SR1 and SR2 respectively located in the two different display units 150 would form a so-called ring-shaped pattern SR. In other words, each ring-shaped pattern SR is distributed in two adjacent display units 150 and the above-mentioned ring-shaped pattern SR is divided into two semi-ring-shaped patterns SR1 and SR2 by a data line 140. As shown by FIG. 3, the notch of the semi-ring-shaped pattern SRI is, for example, towards the right side while the notch of the semi-ring-shaped pattern SR2 is, for example, towards the left side.

In a same display unit 150, the connection place between the semi-ring-shaped pattern SR1 and the semi-ring-shaped pattern SR2 is corresponding to, for example, the region X between the first pixel electrode P1 and the second pixel electrode P2. Since the connection place between the semi-ring-shaped pattern SRI and the semi-ring-shaped pattern SR2 is not close to the data line 140 so that the capacitance coupling effect is not easily produced. In addition, since the meshed common line 160 does not have a pattern parallel to the data lines 140 at the position under the data lines 140, the capacitance coupling effect between the meshed common line 160 and the data lines 140 is not easily produced too.

In addition to the ring-shaped patterns SR, the meshed common line 160 can further include a plurality of connection patterns C, wherein the connection patterns C are connected between the ring-shaped patterns SR, and the connection patterns C are intersected with the first scan lines 120 and the second scan lines 130. For example, the connection patterns C, the first pixel electrodes P1 and the second pixel electrodes P2 are fabricated with a same PEP. In other words, the connection patterns C, the first pixel electrodes P1 and the second pixel electrodes P2 belong to a same patterned film layer and substantially have the same material.

Based on the depiction above, since the overlaying area of the meshed common line of the present invention and the data lines is small, so that on the active device array substrate of the present invention the parasitic capacitance between the data lines and the meshed common line can be effectively reduced, which further reduces the bright-dark lines problem in the prior art.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:

1. An active device array substrate, comprising:
   a substrate;
   a plurality of first scan lines;
   a plurality of second scan lines, wherein the first scan lines and the second scan lines are alternately arranged on the substrate;
   a plurality of data lines disposed on the substrate and intersected with the first scan lines and the second scan lines;
   a plurality of display units disposed on the substrate, wherein each of the display units is respectively located between two adjacent data lines and comprises:
      a first pixel electrically connected to one of the first scan lines;
      a second pixel electrically connected to one of the second scan lines,
   wherein the first pixel and the second pixel are respectively electrically connected to a different data line; and
   a meshed common line disposed on the substrate and located under the display units, wherein the meshed common line comprises a plurality of ring-shaped patterns electrically connected to each other, each of the ring-shaped patterns comprises two semi-ring-shaped patterns connected to each other and respectively located at both sides of a single data line, and the two semi-ring-shaped patterns of a same ring-shaped pattern are respectively located under different display units.

2. The active device array substrate as claimed in claim 1, wherein each of the first pixels comprises a first active device and a first pixel electrode electrically connected to the first active device, and each of the second pixels comprises a second active device and a second pixel electrode electrically connected to the second active device.

3. The active device array substrate as claimed in claim 2, wherein in a same display unit, a semi-ring-shaped pattern extends along the edge of the first pixel electrode and another semi-ring-shaped pattern extends along the edge of the second pixel electrode.

4. The active device array substrate as claimed in claim 3, wherein in a same display unit, the connection place between the two semi-ring-shaped patterns is corresponding to a region between the first pixel electrode and second pixel electrode.

5. The active device array substrate as claimed in claim 2, wherein the meshed common line further comprises a plurality of connection patterns, wherein the connection patterns are intersected with the first scan lines and the second scan lines, and the connection patterns are electrically connected between the ring-shaped patterns.

6. The active device array substrate as claimed in claim 5, wherein a material of the connection pattern is substantially the same as that of the first pixel electrodes and the second pixel electrodes.

7. The active device array substrate as claimed in claim 1, wherein materials of the first scan lines and the second scan lines and the ring-shaped patterns are substantially the same.

8. The active device array substrate as claimed in claim 1, wherein the meshed common line does not have a pattern parallel to the data lines at the location under the data lines.

* * * * *